May 19, 1942.  A. G. KANDOIAN  2,283,676

PHASE MEASURING ARRANGEMENT

Filed Dec. 1, 1939

INVENTOR
ARMIG KANDOIAN
BY
ATTORNEY

Patented May 19, 1942

2,283,676

UNITED STATES PATENT OFFICE 2,283,676

PHASE MEASURING ARRANGEMENT

Armig G. Kandoian, New York, N. Y., assignor to International Telephone & Radio Manufacturing Corporation, a corporation of Delaware Application December 1, 1939, Serial No. 307,063

16 Claims. (Cl. 172—245)

My invention relates to radio frequency measuring apparatus and more specifically to devices for measuring phase relationships in antennas and radio frequency lines.

An object of the invention is to provide a direct reading instrument for measuring phase relationships in antennas or lines carrying radio frequency currents.

For the purpose of obtaining directivity or special radiation effects, antenna arrays frequently have their individual units excited in differing phase relations. To check the phase relationships in these antennas or to adjust the relationships to a desired value, it is of convenience to have a direct-reading phase meter. Common procedure, however, calls for measurements and calculations.

The present invention provides a system which gives a direct indication of the phase of two antenna voltages or currents in terms of a function of the angle or the angle itself. This is brought about by the use of high impedance lines connected at one end to an ammeter, voltmeter or some other measuring device, calibrated in terms of phase relation and adjustably connected at the other end to sources of standing waves, the standing waves being created by the transmitter or transmitters whose excitation phase is desired.

It is also possible to use this system without a source of standing waves by the inclusion of some means with the current measuring device for adjusting the current through the device, such as by varying the coupling of the device to its lines, or if the magnitudes of the currents or voltages in the antennas are known to be equal.

The invention may be more easily described by the use of the attached drawing wherein.

Figure 1:
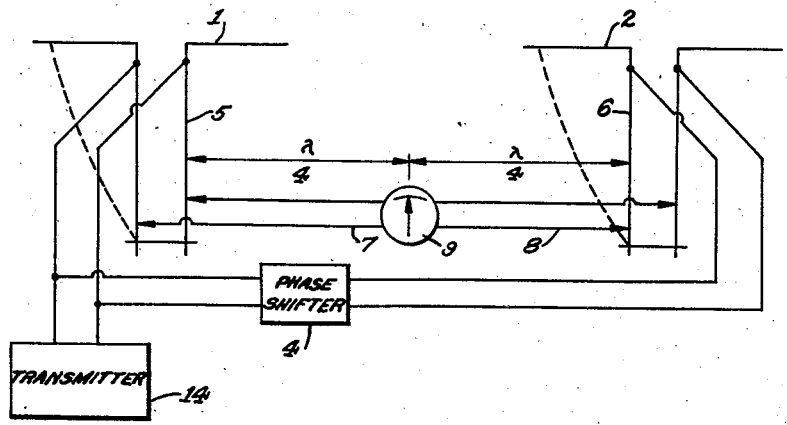
Fig. 1 is illustrative of the use of the invention with antennas having associated tuned lines.

In Fig. 1 antennas 1 and 2 are fed by transmitter 14. The phase of the current in antenna 1 is adjusted relative to that of antenna 2 by phase shifter 4. Lines 5 and 6 associated with these antennas are tuned in a well-known manner, as for example by Lecher wires, so as to have the standing waves of voltage and current. Lines 7 and 8 connecting to meter 9 are of a quarter-wavelength in magnitude with respect to the frequency of the transmitter 14 so as to present a high impedance to the antenna lines 5 and 6 and cause little change in the antenna current or voltage distribution, since the transmission field from lines 5 and 6 is determined by their relative geometrical positions and the relative phases and amplitude of the output energies therefrom, the present invention being concerned with the determination of this phase difference only. It is also possible to make lines 7 and 8 of any odd multiple of a quarter-wave in length since these lengths of lines are practically equivalent in impedance when terminated by a low resistance or short circuit. Meter 9, which may be an ammeter of the hot wire type, has a scale which is calibrated either in terms of functions of an angle or in terms of angles. Meter 9 may be of any well-known hot-wire type adapted to have its terminals connected across the conductors of the lines 7 and 8 so that the hot-wire current is proportional to the phase difference of the waves arriving respectively from lines 5 and 6.

The procedure for measuring phase in the above case may be outlined as follows:

a. Connect line 7 to line 5 and adjust the point of connection of line 7 on line 5 until meter 9 reads at some arbitrary point on the scale intermediate the extreme readings thereof which point may be regarded as zero.

b. If the lines 5 and 6 of antennas 1 and 2 are fed by equal currents, line 8 may be placed on line 6 in a position similar to that of line 7 on line 5 and the phase relationship will be indicated by meter 9. If, however, the currents are unequal in magnitude the following procedure should be carried out. Note the point of contact of line 7 with line 5 and remove line 7. Connect line 8 to line 6 and vary its position until meter 9 reads at the same "zero" point as in part "a." Then, replace line 7 at the original point and meter 9 will give the phase of the antenna voltages or currents directly since the difference between the reading then obtained and that obtained at the original arbitrarily selected reference point will indicate the phase relation of the currents in the two antennas. Ordinarily it will be found preferable to calibrate the meter 9 in degrees reading from a minimum of 180° to a maximum of 0°, and to use the 90° point as the above-mentioned arbitrarily selected reference or "zero" point, in which case the final reading of the meter with both of lines 7 and 8 connected thereto will indicate directly the phase relation in degrees.

No phase error is introduced by not having lines 7 and 8 at corresponding positions on lines 5 and 6 because all points on a standing wave have the same phase. Changing the positions of these lines puts them at points of different potential thus allowing adjustment of the meter current.

Figure 2:
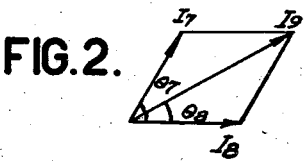
Fig. 2 is a vector diagram of the current of the phase meter of Fig. 1.

The reason that the meter may be calibrated to read directly in functions of an angle or angles is explained in connection with the vector diagram of Fig. 2. Suppose that $I_7$ is the meter current when line 7 is connected to line 5, and $I_8$ is the meter current when line 8 is connected to line 6. When both lines 7 and 8 are connected, the meter current is the sum of these two currents, $I_9$, or if $I_7=I_8$, then $\theta_7=\theta_8$ and $$I_9 = 2\ I_8 \cos \theta_8 = 2\ I_7 \cos \theta_7 = 2\ I_{7\ 8} \cos \theta_{7\ 8}$$

In other words, the magnitude of $I_9$ with a fixed arbitrary scale point is proportional to twice the angle cosine. This cosine factor may be interpreted into any of the other functions or the angle itself when applied to the meter scale.

Figure 3:
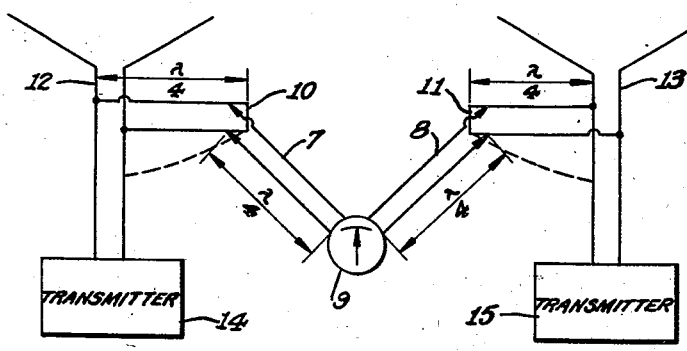
Fig. 3 is illustrative of the use of the invention with radio frequency transmission lines.

When there are no standing waves on the lines from which measurements are to be taken, high impedance conductors can be connected across the lines at corresponding positions, as shown at 10 and 11 in Fig. 3. These conductors may be a quarter-wavelength long or any odd multiple thereof if short circuited at their ends, or may be a half-wavelength long or any multiple thereof if open circuited at their ends. In this case, for purposes of illustration, lines 12 and 13 are shown as energized by two transmitters 14 and 15 although they may be fed by the same transmitter. The high impedance lines 10 and 11 are utilized in the same manner as lines 5 and 6 of the preceding discussion. Lines 7 and 8 are alternately connected and then simultaneously connected, the phase being indicated on meter 9.

A further advantage is gained by the use of lines 10 and 11 in that the leading or lagging current may also be determined. Suppose that after a phase reading is taken, line 10 is moved a short distance along line 12 toward transmitter 14, and the phase is again measured. If this latter reading indicates that the phase angle is smaller than the first reading, then the current of line 13 must lead that of line 12. Similarly, if the second reading indicates a larger phase angle than the first, the current of line 12 must lead that of line 13.

The auxiliary lines 10 and 11 and the meter lines 7 and 8 may be adjustable in length to allow the meter to be used over a range of frequencies. This system is particularly adapted to high frequencies but is restricted only by the tolerable length of meter connecting lines. The auxiliary lines may also be used with the tuned lines of the first case, but it was shown that the auxiliary lines were not necessary since available standing waves were already present. These lines may be calibrated in terms of frequency or wavelength or some similar unit to facilitate their use over a range of frequencies.

Although the auxiliary lines and the meter lines were described as having a length of some multiple of a quarter-wavelength at the frequency of the currents being measured, it is to be understood that these lines may include inductance, resistance, or capacity in such a manner as to enable the physical length of line to be of any desired length while the electrical length or impedance of these lines is of a high value. In any event it is preferable to make the lines of high impedance with respect to the impedance of the sources to be compared so as to cause little effect upon the normal current distributions.

Figure 4:
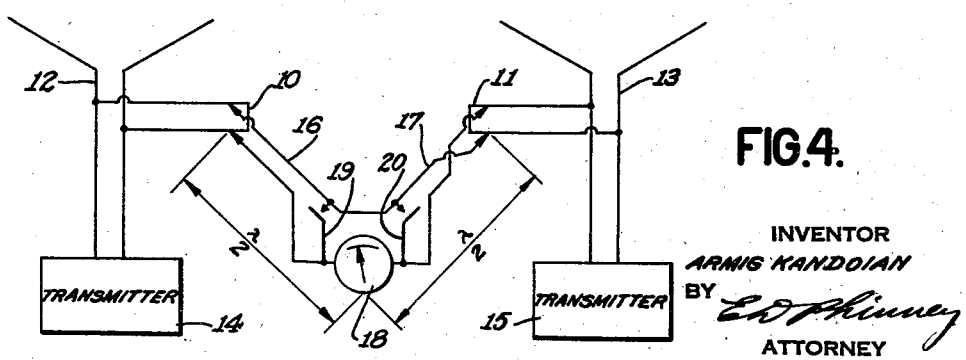
Fig. 4 illustrates an alternative system for direct phase measurement.

An alternative, although less desirable, method of measuring the phase directly is shown in Fig. 4. As in Fig. 3 transmitters 14 and 15 energize lines 12 and 13 and standing waves are produced on conductors 10 and 11. Meter lines 16 and 17 are in this case a half-wavelength long or any multiple thereof. A high impedance meter 18 terminates one conductor of each line. By closing shorting switch 19 and disconnecting line 16 from conductor 10 an indication of the current in line 13 will be obtained which may be adjusted to an arbitrary or "zero" value by sliding line 17 along conductor 11. Then, after noting the position of line 17 on conductor 11, line 17 may be disconnected, switch 19 opened, switch 20 closed, and line 16 connected to conductor 10 and adjusted to give a meter reading at the same reference or "zero" point on the meter scale. Finally, both of the shorting switches 19 and 20 should be opened and line 17 reconnected to the original noted position. With these last connections the meter 18 will indicate the phase relation. One of the lines 16 and 17 must be reversed with respect to the meter to prevent a 180° reversal of the phase relation.

In a similar manner a high impedance shunt meter may be used in any of the aforesaid arrangements provided that the meter lines are of the correct length to permit a high terminating impedance.

It is to be understood that any device indicative of the current or voltage in the meter lines may be used as the above-mentioned meter.

While I have described particular embodiments of my invention for purposes of illustration, it will be understood that various adaptations and modifications thereof may be made within the spirit of the invention as set forth in the appended claims.

What is claimed is:

1. An arrangement for measuring phase relations between high frequency currents in a plurality of elements energized by high frequency means, comprising a two-conductor line having a high impedance at the frequency of the energy to be measured connected at one end to one of said elements and connected at the opposite end to another of said elements, and a meter connected intermediate said connections for measuring the voltage between the conductors of said line, said meter being connected at a point approximately one-quarter wave length removed from each of said connections.

2. An arrangement for measuring phase relations between high frequency currents in a plurality of elements energized by high frequency means, comprising a two-conductor line connected at one end to one of said elements and connected at the opposite end to another of said elements, and a low impedance meter connected across said line intermediate said connections at a point substantially an odd multiple of a quarter-wavelength electrically from each of said connections for measuring the short circuit current at said point.

3. An arrangement for measuring phase relations between high frequency currents in a plurality of elements energized by high frequency means, comprising a two-conductor line connected at one end to one of said elements and connected at the opposite end to another of said elements, and a high impedance meter connected substantially a multiple of a half-wavelength electrically from said connections for measuring the voltage between the conductors of said line.

4. An arrangement for measuring phase relations between high frequency currents in a plurality of elements energized by high frequency means, comprising conductors adjustably connected respectively to said elements in such a manner as to produce standing waves on said conductors, a two-conductor line having a high impedance at the frequency of the energy to be measured adjustably connected at one end to one of the first mentioned conductors and adjustably connected at the opposite end to another of the first mentioned conductors, and a meter connected intermediate said connections for measuring the voltage between the conductors of said line.

5. An arrangement for measuring phase relations between high frequency currents over a range of frequencies, comprising a plurality of sources of standing waves, a plurality of adjustable lines having a high impedance at the frequency of the energy to be measured connected respectively at one end to said sources, and a current measuring device terminating the opposite end of said lines for directly indicating said phase relation between said sources.

6. An arrangement according to claim 5 wherein said adjustable lines are calibrated so as to be readily adjustable to an odd multiple of a quarter of a wavelength electrically at the current frequency.

7. An arrangement for measuring phase relations between high frequency currents in a plurality of elements and energized by high frequency means, comprising adjustable high impedance conductors connected respectively to said elements in such a manner as to produce standing waves on said adjustable conductors, an adjustable two-conductor line having a high impedance at the frequency of the energy to be measured connected at one end to one of the first mentioned conductors and connected at the opposite end to another of the first mentioned conductors and a meter connected intermediate said connections for measuring the voltage between the conductors of said line.

8. An arrangement according to claim 7 wherein said adjustable conductors and said adjustable lines are calibrated so as to be readily adjustable to a multiple of a quarter of a wavelength electrically at the current frequency.

9. An arrangement for measuring phase difference and phase sense between high frequency currents in a plurality of elements energized by high frequency means, comprising high impedance conductors adjustably connected respectively to said elements in such a manner as to produce standing waves on said conductors, a two-conductor line having a relatively high impedance at the frequency of the energy to be measured adjustably connected at one end to one of the first mentioned conductors and adjustably connected at the opposite end to another of the first mentioned conductors, and a meter connected intermediate said connection for measuring the voltage between the conductors of said line.

10. An arrangement for measuring phase relations between high frequency currents in a plurality of elements energized by high frequency means comprising a two-conductor line having a relatively high impedance at the frequency of the energy to be measured connected at one end to one of said elements and connected at the opposite end to another of said elements, a meter connected intermediate said connections for measuring the voltage between the conductors of said line, and means for adjusting the magnitude of the voltage applied to said meter.

11. An arrangement for measuring phase relations between high frequency currents, comprising a plurality of sources of standing waves, a plurality of lines connected respectively at one end to said sources and substantially a quarter wavelength long, a low impedance current measuring device terminating the opposite end of said lines for directly indicating said phase relations, and means for adjusting the magnitude of the current through said current measuring device.

12. An arrangement for measuring phase relations between high frequency currents, comprising a plurality of sources of standing waves, a two-conductor line substantially a multiple or a half-wave long connected between said sources, a high impedance current measuring device inserted in one conductor of said line at a point a half-wave length from said sources for directly indicating said phase relations, short circuiting switches adjacent said device for short circuiting said lines, and means for adjusting the magnitude of the current through said current measuring device.

13. A method of directly indicating the phase relation between two high frequency currents by means of a calibrated meter, which comprises applying a voltage of a predetermined value developed by one of said currents to said meter over a two-conductor line having its length proportioned with respect to the frequency of said currents so as to present a high impedance thereto without causing a substantial disturbance in the distribution of said one current, applying a voltage of a predetermined value developed by the other of said currents to said meter without causing a substantial disturbance in the distribution of said other current, and indicating directly the phase relation by the composite effect of said voltages on said meter.

14. A method of directly indicating the phase relation between two sources of high frequency voltage applied to a calibrated meter, which comprises separately applying voltages from said sources to said meter without substantially disturbing the distribution thereof at said sources, adjusting independently the applied voltages from each of said sources to predetermined values, applying simultaneously said adjusted voltages to said meter, and indicating the phase relation of said sources by the composite effect of said voltage on said meter.

15. A direct indicating phase meter for indicating the phase relation between voltages from two sources of high frequency energy, comprising a calibrated meter, two-conductor transmission line coupling means having its length proportioned with respect to the frequency of said energy so as to present a high impedance relative to said sources for applying voltages from said sources and to said meter, and means operatively associated with said coupling means for separately adjusting the applied voltages to predetermined values and for simultaneously applying the voltages of adjusted value to said meter.

16. A direct indicating phase meter for indicating the phase relation between two sources of high frequency energy, comprising means for developing standing waves from said energy sources, a calibrated meter, coupling means presenting a high impedance relative to said source for applying energy from said standing waves to said meter, and means operatively associated with said coupling means for separately adjusting the applied energy to predetermined values, whereby a direct indication is obtained by simultaneous application of energy of said predetermined values to said meter.

ARMIG G. KANDOIAN.